(12) United States Patent
Prabhakaran et al.

(10) Patent No.: US 8,456,643 B2
(45) Date of Patent: Jun. 4, 2013

(54) METHOD AND SYSTEM FOR MAPPING THE SHAPE OF A HEAD UNDER OPERATING CONDITIONS

(75) Inventors: Vijay Prabhakaran, Fremont, CA (US);
Wuxing Gan, Fremont, CA (US);
Ladislav R. Pust, Pleasanton, CA (US);
David E. Fowler, San Jose, CA (US);
Lanshi Zheng, San Ramon, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 313 days.

(21) Appl. No.: 12/886,408

(22) Filed: Sep. 20, 2010

(65) Prior Publication Data

US 2011/0286129 A1    Nov. 24, 2011

Related U.S. Application Data

(60) Provisional application No. 61/347,775, filed on May 24, 2010.

(51) Int. Cl.
*G01B 11/02* (2006.01)
*G11B 5/00* (2006.01)
*G11B 5/596* (2006.01)

(52) U.S. Cl.
USPC ........... 356/507; 356/505; 360/75; 360/77.03

(58) Field of Classification Search
USPC ..................... 356/505, 507; 360/75, 77.03
See application file for complete search history.

(56) References Cited

U.S. PATENT DOCUMENTS

| | | | |
|---|---|---|---|
| 4,913,547 A * | 4/1990 | Moran | 356/489 |
| 5,805,284 A * | 9/1998 | Lacey | 356/507 |
| 5,949,546 A * | 9/1999 | Lee et al. | 356/492 |
| 6,950,267 B1 * | 9/2005 | Liu et al. | 360/75 |
| 7,027,242 B1 | 4/2006 | Terrill et al. | |
| 7,542,246 B1 | 6/2009 | Song et al. | |
| 7,573,682 B2 | 8/2009 | Pust et al. | |
| 2004/0141186 A1 * | 7/2004 | Hu et al. | 356/507 |
| 2005/0165561 A1 * | 7/2005 | Zeng | 702/41 |
| 2006/0103959 A1 | 5/2006 | Lu | |
| 2008/0080086 A1 * | 4/2008 | Che et al. | 360/75 |
| 2008/0198510 A1 | 8/2008 | Sugimoto et al. | |
| 2008/0225427 A1 | 9/2008 | Liu | |
| 2009/0113464 A1 * | 4/2009 | Gage et al. | 720/674 |
| 2009/0268335 A1 | 10/2009 | Huang et al. | |

OTHER PUBLICATIONS

Vladimir Nikitin, et al., "Spatial and Temporal Profiling of Protrusion in Magnetic Recording Heads", IEEE Transactions on Magnetics, vol. 40, No. 1, Jan. 2004, pp. 326-331.

(Continued)

*Primary Examiner* — Gregory J Toatley
*Assistant Examiner* — Dominic J Bologna

(57) ABSTRACT

A method and system for determining a shape of a portion of an air-bearing surface (ABS) of a head residing on a slider are described. The ABS is configured to fly at a fly height from and with a velocity with respect to a disk during normal operating conditions. The method and system include driving at least one heater residing in the head while the slider is substantially at the normal operating conditions with respect to the disk and the fly height. The shape of the portion of the ABS changes in response to the heater(s) being driven. The method and system also include performing Doppler measurements on the slider while the heater is driven. The shape may then be determined based on the Doppler measurements.

20 Claims, 6 Drawing Sheets

OTHER PUBLICATIONS

M. Kurita, et al., "Optical Measurement of Flying-Height Change Due to Thermal Protrusion of Magnetic Head", Asia-Pacific Magnetic Recording Conference—2006, Publication Date: Nov. 29, 2006-Dec. 1, 2006, 1 page.

Junguo Xu, et al., "Thermal Analysis of a Magnetic Head", IEEE Transactions on Magnetics, vol. 40, No. 4, Jul. 2004, pp. 3142-3144.

M. Kurita, et al., "Flying-Height Reduction of Magnetic Head Slider Due to Thermal Protrusion", Magnetics Conference 2005, INTERMAG Asia 2005, Digests of the IEEE International, Publication Year: 2005, pp. 1401-1402.

Junguo Xu, et al., "High-Resolution Measurement of Temperature Distribution in Head Coil and Air Bearing Surface", IEEE Transactions on Magnetics, vol. 39, No. 5, Sep. 2003, pp. 2411-2413.

* cited by examiner

METHOD AND SYSTEM FOR MAPPING THE SHAPE OF A HEAD UNDER OPERATING CONDITIONS

CROSS REFERENCE TO RELATED APPLICATIONS

The present application claims priority from provisional application Ser. No. 61/347,775, filed May 24, 2010, entitled "Measuring and Spatial Mapping Thermal Deformation", assigned to the assignee of the present application.

BACKGROUND

FIG. 1 depicts a side view of portion of a conventional magnetic recording disk drive 10. FIG. 1 is not to scale and only portions of the conventional disk drive 10 are shown. The conventional disk drive 10 includes a disk 12 and a conventional slider 20 that is typically attached to a suspension (not shown). In operation, the slider 20 flies a distance, known as the fly height h, above the conventional disk 12 while the conventional disk 12 spins. Thus, the slider 20 and disk 12 are in relative motion. An air bearing is formed between the conventional disk 12 and the slider 20 at the air-bearing surface (ABS) 22 due to this relative motion. Using magnetic recording write and read transducers on the slider 20, data may be written to and read from portions of the conventional disk 12.

The current trend in magnetic recording is toward increasing the areal storage density of magnetic disk 12. This may be achieved in part by reducing the spacing between the slider 20 and the conventional disk 12. Thus, the fly height, h, may be desired to be reduced. Optimization of the spacing between the conventional slider 20 and the conventional disk 12 for the particular disk drive 10 is also desired. The optimization may, for example, be carried out to ensure that despite the decreased fly height, the slider 20 does not contact the conventional disk 12 while the disk 12 is spinning. As part of this optimization, account is desired to be taken of variations in the spacing. For example, portions 23 of the ABS 22 of the slider 20 may protrude during operation. This protrusion may be due to local heating of the slider 20, for example when a current is driven in the slider 20. Such protrusions 23 further reduce the spacing between portions of the conventional slider 20 and the conventional disk 12.

FIG. 2 depicts a conventional method 50 for measuring variations of the ABS of the conventional slider 20. The conventional method 50 is described in the context of the slider 20 and disk drive 10. The slider 20 is accessed before being placed in the disk drive 10 or is removed from the disk drive 10, via step 52. Thus, the slider 20 is separate from the remaining components of the conventional disk drive 10 during measurements in the method 50.

Portions of the conventional slider 20 are heated, via step 54. Step 54 may be performed, for example, by driving a current through the read and/or write transducer in the conventional slider 20. Thus, thermal protrusions analogous to the thermal protrusion 23 may be formed. The thermal protrusions of portions of the slider 20 are measured, via step 56. Step 56 may, for example, be carried out using techniques such as optical profilometry and/or atomic force microscopy. Alternatively, the temperature of regions of the ABS may be measured in step 56, and the thermal protrusion inferred.

Although the conventional method 50 functions, the information provided may have limited utility. Inferring the protrusion from thermal data may require a significant amount of interpretation and have limited spatial resolution. Profilometry may require equal wear to be assumed and may not be capable of providing a deformation profile under normal operating conditions. Other conventional techniques may have analogous drawbacks. Further, as discussed above, the conventional slider 20 is typically separate from other components in the conventional disk drive 10 during measurement in step 56. The thermal protrusions measured in the method 50 may differ from those that might occur in the conventional disk drive 10. Thus, an accurate determination of the contours of the ABS 22 may not be obtained. Without an accurate determination of the profile of the ABS 22, optimization of the distance between the slider 20 and disk 12 may be difficult.

Accordingly, what is needed are improved methods and systems for mapping the profiles of the ABS in magnetic recording disk drives.

BRIEF SUMMARY OF THE INVENTION

A method and system for determining a shape of a portion of an air-bearing surface (ABS) of a head residing on a slider are described. The ABS is configured to fly at a fly height from and with a velocity with respect to a disk during normal operating conditions. The method and system include driving at least one heater residing in the head while the slider is substantially at the normal operating conditions with respect to the disk and the fly height. The shape of the portion of the ABS changes in response to the heater(s) being driven. The method and system also include performing Doppler measurements on the slider while the heater is driven. The shape may then be determined based on the Doppler measurements.

DETAILED DESCRIPTION OF EMBODIMENTS OF THE INVENTION

Figure 1:
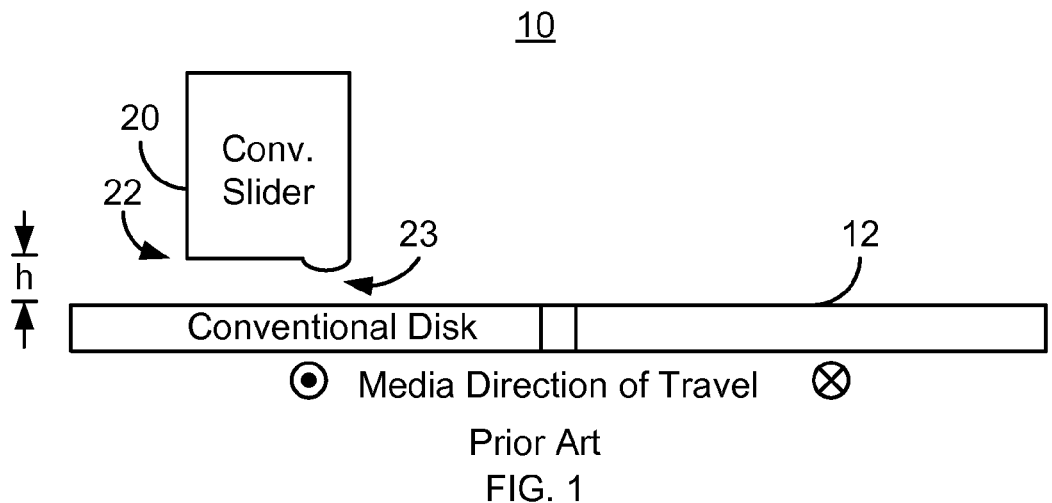
FIG. 1 is a diagram depicting a portion of a conventional energy assisted magnetic recording disk drive.
Figure 2:
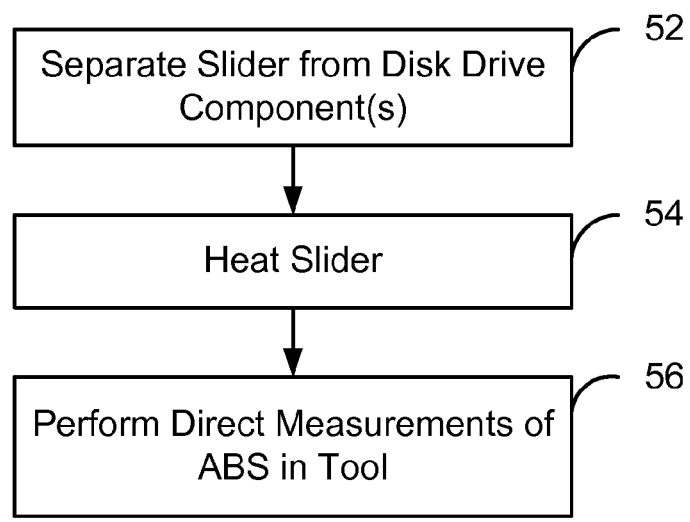
FIG. 2 is a flow chart depicting a conventional method for determining the profile of a surface in a conventional disk drive.
Figure 3:
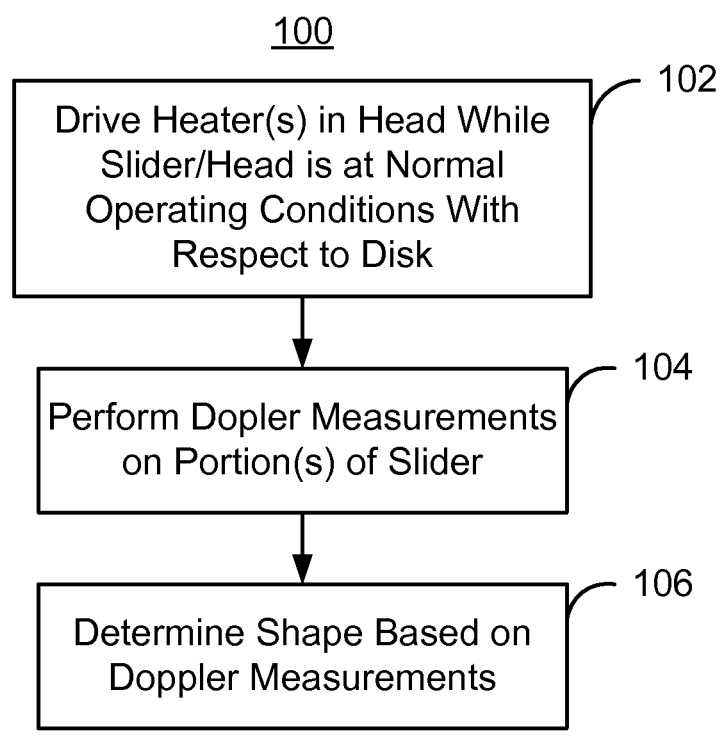
FIG. 3 is a flow chart depicting an exemplary embodiment of a method for determining the profile of a surface in a disk drive.

FIG. 3 is a flow chart depicting an exemplary embodiment of a method 100 for determining the profile of a surface a disk drive. Although certain steps are shown, some steps may be omitted, interleaved, performed in another order, and/or combined. The method 100 is used in determining a shape of a portion of an air-bearing surface (ABS) of a head residing on a slider. The ABS is configured to fly at a fly height from and with a velocity with respect to a disk during normal operating conditions. Stated differently, the disk drive is designed such that the ABS of the head/slider flies at the fly height when the disk is spun at an angular velocity. This angular velocity translates to a linear velocity at particular portions of the disk. The actual fly height and velocity corresponding to the normal operating conditions may vary depending upon the specifics of the design of the disk drive.

One or more heaters residing in the slider are driven while the slider is at substantially normal operating conditions, via step 102. Stated differently, the heaters are driven while the slider is substantially at the fly height and velocity relative to the disk. In some embodiments, the heater is driven in an AC manner, for example in a sinusoidal or cosinusoidal wave form. The frequency at which the heater is driven is desired to be smaller than the heater response frequency so that a quasi-static response of the heater may be obtained. In addition, the frequency may be selected to be different from the frequency of other known components to displacement of the slider, such as spindle runout and actuator resonances. Driving the heater heats the head, which may cause a portion of the ABS to deform. For example, a portion of the ABS may protrude. Because the heater is driven in an AC fashion, the magnitude of the protrusion of the ABS also changes over time. In some embodiments, the heater(s) used in step 102 may be heaters already present in the head. For example, heaters used in heat actuation may be employed. In other embodiments, heaters may be placed in the head specifically for use in the method 100.

Doppler measurements are performed on at least a portion of the slider while the heater is driven, via step 104. The portion of the slider may include part or all of the ABS. Step 104 may, for example, be performed using a laser Doppler vibrometer. Because the Doppler measurements are performed while the heater is being driven, the Doppler measurements are also undertaken while the slider is subjected to normal operating conditions with respect to the disk. More specifically, the slider is substantially at the designed fly height and velocity with respect to the disk while the Doppler measurements are taken.

The Doppler measurements taken in step 104 provide the velocity of a portion of the ABS. The Doppler measurements may use light that travels in a direction substantially perpendicular to the surface of the disk and that is reflected from the ABS. Thus, the Doppler measurements may determine the velocity of the ABS and its distortion in a direction perpendicular to the surface of the disk. In embodiments in which the heater is driven in an AC manner, the velocity changes over time. Doppler measurements taken at an individual location indicate the change in the location's velocity perpendicular to the surface of disk over time. Doppler measurements may be taken not only taken multiple times at a particular location, but also at multiple locations across the ABS. For example, the laser Doppler vibrometer may be used to periodically scan the ABS. The locations on the ABS at which Doppler data are obtained may include sites in proximity to the heater, where the protrusion is expected to be greater. The locations on the ABS at which Doppler measurements are performed may also include sites distal from the heater, where the protrusion is expected to be minimal.

The shape of the ABS is determined based on the Doppler measurements, via step 106. Step 106 may include integrating the velocity determined by the Doppler measurements at each location of the ABS over time. Thus, the change in the displacement at a particular time may be obtained for each location on the ABS. By accounting for features such as the initial shape (without heating) of the ABS, the pitch of the head with respect to the surface of the disk, and rigid body motion of the slider, the shape of the ABS during heating may be determined. The initial shape and pitch of the head may be accounted for arithmetically, by combining the known profile at the known pitch with the profile determined using Doppler measurements. Rigid body motion may, for example, be accounted for using the Doppler measurements and an understanding that as one portion of the ABS protrudes toward the disk, the surrounding portion of the ABS is pushed further from the disk. Thus, the deformation(s) in the ABS due to the heater may be determined.

Figure 4:
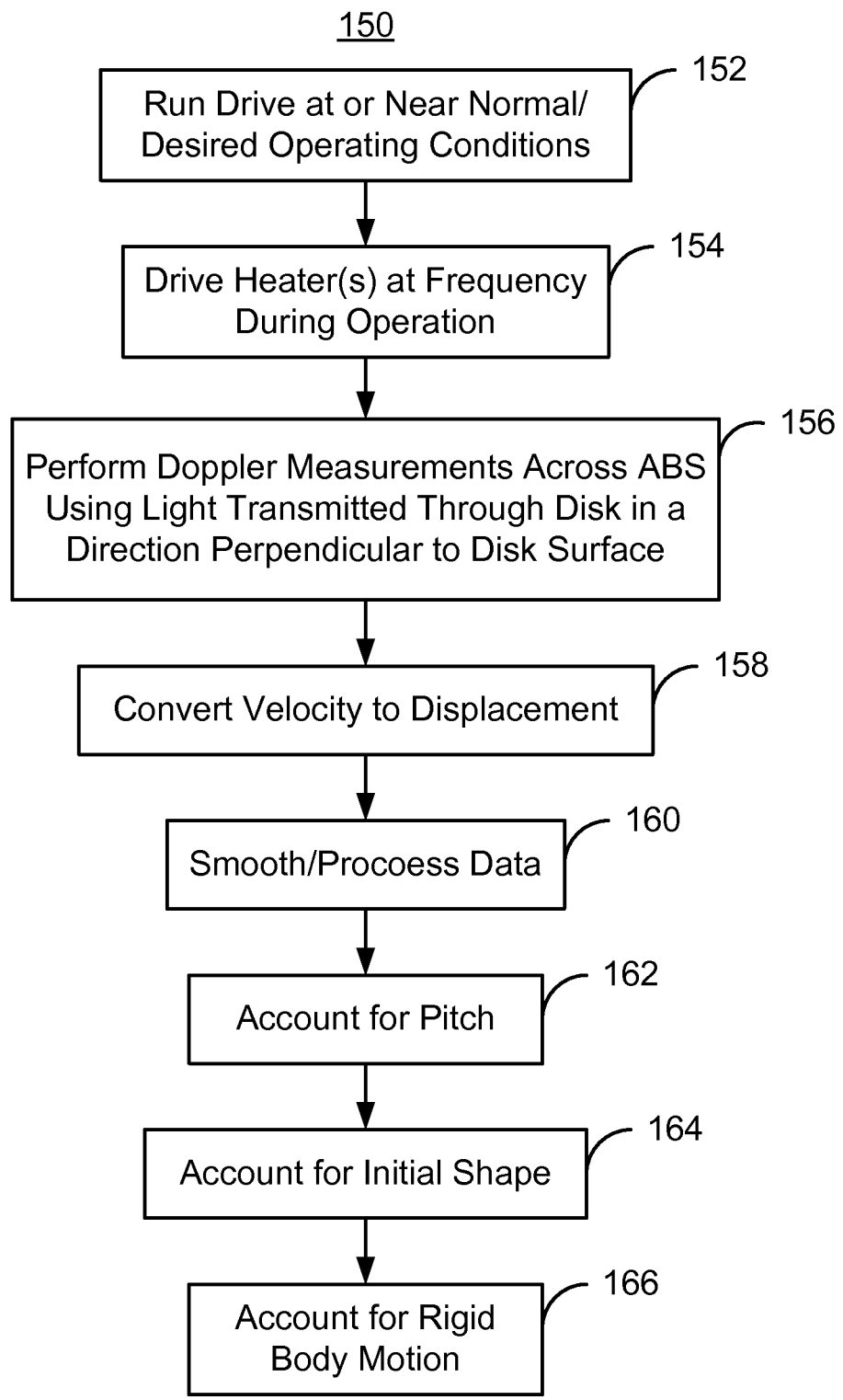
FIG. 4 is a flow chart depicting another exemplary embodiment of a method for determining the shape of a portion of a head.
Figure 5:
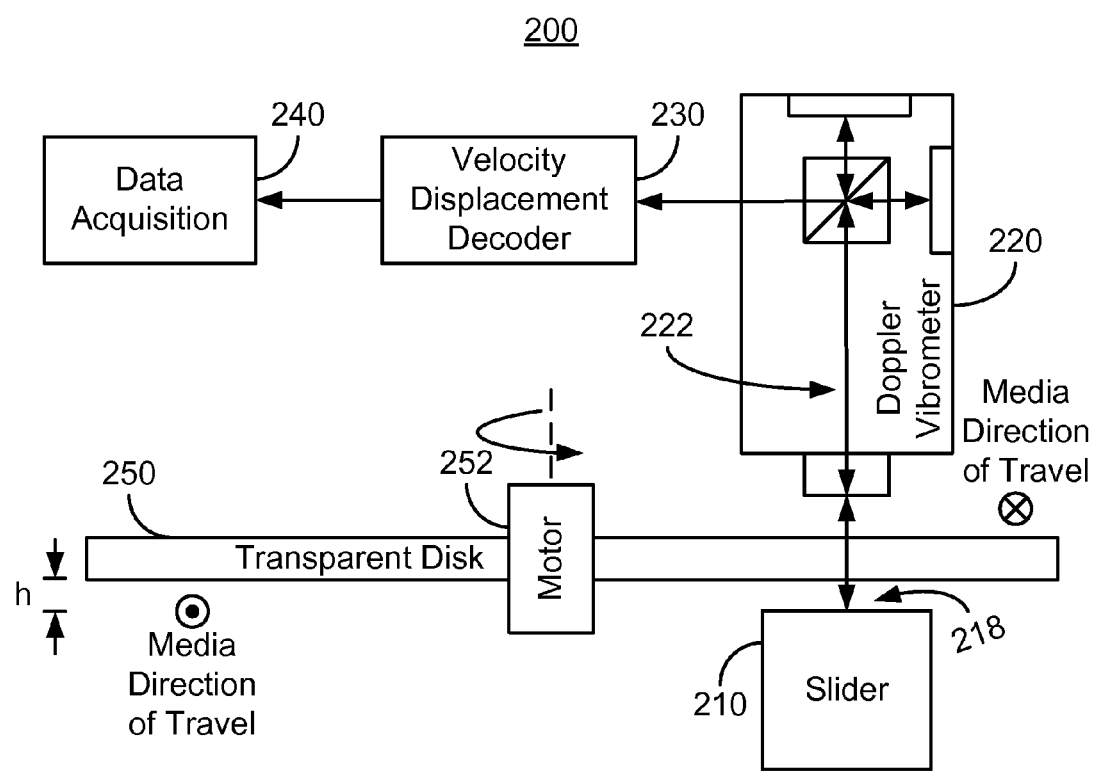
FIGS. 5-7 are diagrams depicting an exemplary embodiment of a system for determining the profile of a magnetic recording head.
Figure 6:
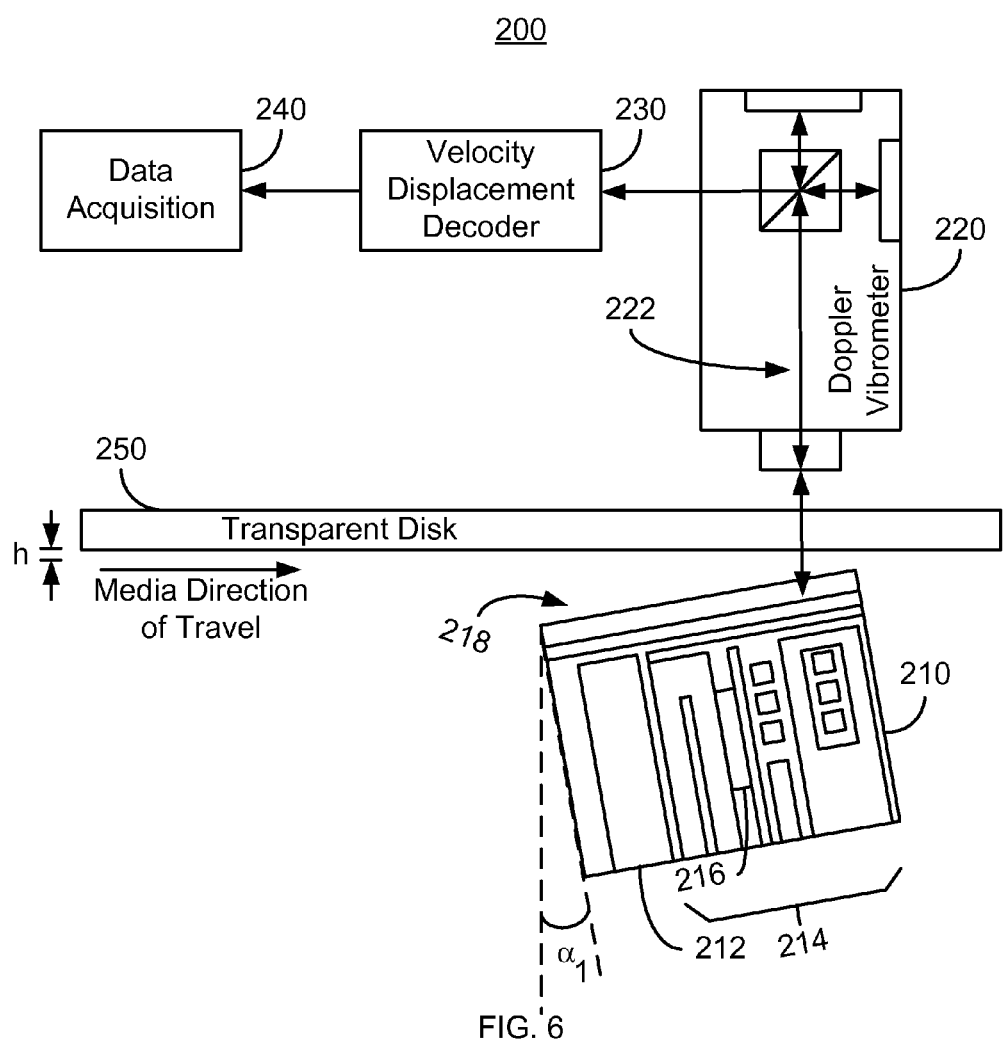
Figure 7:
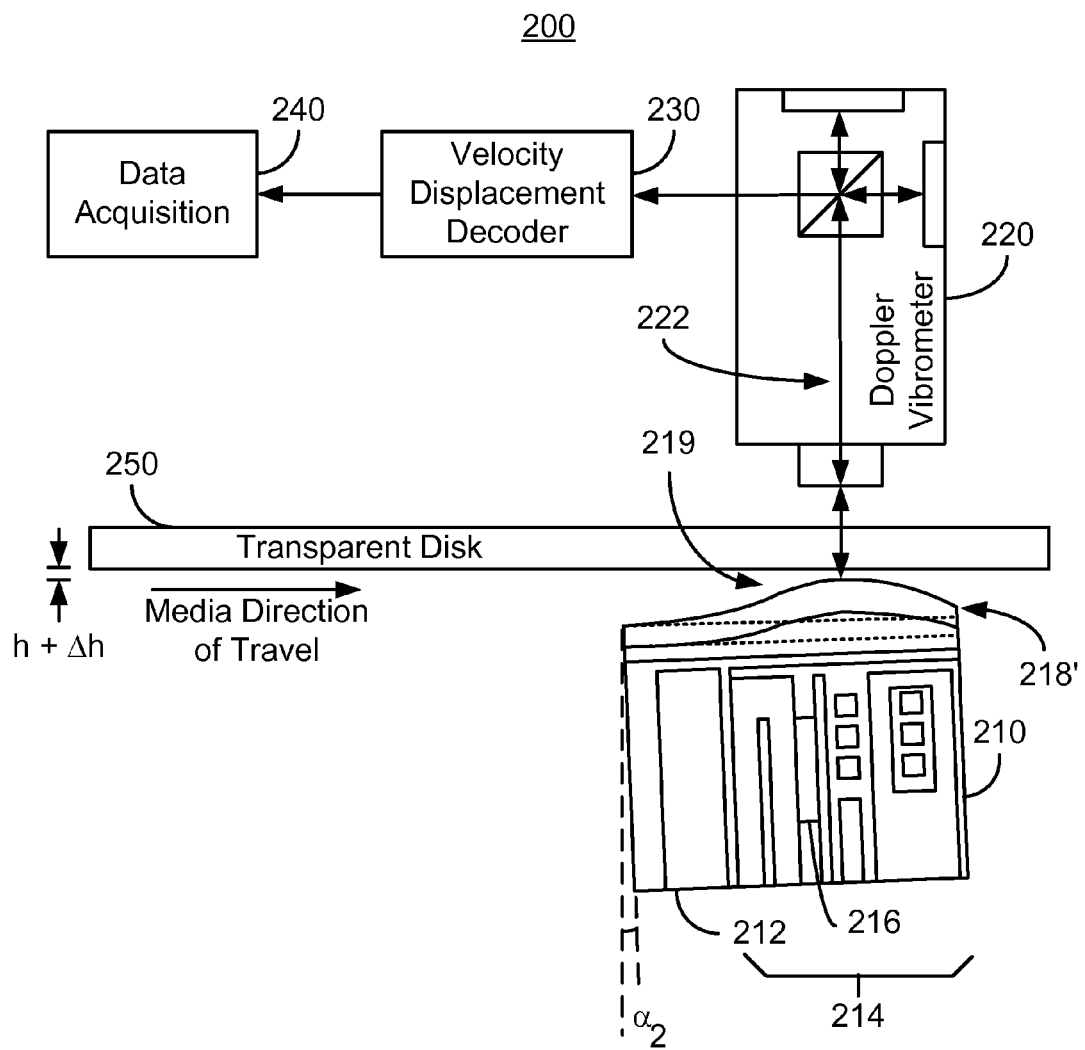

Using the method 100, the shape of the ABS may be determined with applied heating while at normal operating conditions. The shape of the ABS measured using the method 100 may be closer to what would be encountered in an operating disk drive. As a result, a more accurate profile of the ABS under normal operating conditions may be obtained. This profile may be used, for example in optimizing the desired fly height and other characteristics of the disk drive FIG. 4 is a flow chart depicting another exemplary embodiment of a method 150 for determining the shape of a portion of the ABS of a head. FIGS. 5-7 are diagrams depicting an exemplary embodiment of a system 200 for determining the profile of a magnetic recording head. For clarity, FIGS. 5-7 are not to scale. Further, for simplicity, not all components are labeled in FIGS. 5-7. Referring to FIGS. 4-7, the method 150 is described in the context of the particular components shown. However, the method 150 may be used to test another device (not shown). Although certain steps are shown for the method 150, some steps may be omitted, interleaved, performed in another order, and/or combined.

FIGS. 5-6 depict the system 200 prior to measurement/heating using the method 150. The system 200 includes a slider 210, Doppler vibrometer 220, velocity displacement decoder 230, data acquisition block 240, and disk 250 driven by motor 252. As can be seen in FIGS. 5-6, the slider 210 is initially at a pitch angle, $\alpha_1$. The slider 210 includes a read transducer 212, write transducer 214, and ABS 218 of the slider 210/transducers 212 and 214. The head may be considered to include the transducers 212 and 214. Also included on the slider 210 is a heater 216. In the embodiment shown in FIGS. 5-6, the heater 216 and/or other portions of the slider 210 are not driven at a high enough power to generate enough heat to deform the ABS 218. In some embodiments, the ABS 218 is coated with a reflective metal to reduce optical artifacts without significantly degrading flying performance. The Doppler vibrometer 220 is a laser Doppler vibrometer 220 that uses light 222 from a laser (not explicitly shown) to measure the velocity of the ABS 218. In the embodiments shown, light 222 is provided substantially perpendicular to the surface of the disk 250. Thus, the velocity measured by the laser Doppler vibrometer 220 is substantially perpendicular to the surface of the disk 250. The velocity displacement decoder 230 translates an output signal from the Doppler vibrometer 220 to a displacement. As the output from the Doppler vibrometer 220 is typically a velocity, the velocity displacement decoder 230 generally translates the output velocity to a displacement. However, in other embodiments, the Doppler vibrometer 220 might output another signal, such as a frequency shift. In such embodiments, the velocity displacement decoder 230 may still convert this output to a displacement. In some embodiments, the velocity displacement decoder 230 further processes data, as described below. Data acquisition block 240 may control data collection, as is described below. Thus, blocks 230 and 240 may be implemented in software. The system 200 and method 150 thus operate measure deformation of the ABS 218 of the slider 210.

The method 150 commences with the system 200 being run such that the slider 210 and disk 250 are run at desired operating conditions, via step 152. In general, step 152 includes spinning the disk 250 at a normal angular frequency such that the ABS 218 is at the fly height and velocity with respect to the disk of normal operating conditions. However, in other embodiments, the slider 210 may be moved to a different fly height and/or the disk 250 may be spun at a different angular velocity.

The heater 216 is driven at a desired frequency during operation of the system 200, via step 154. Thus, steps 154 and 156 may be performed together. The heater 216 is thus driven while the slider 210 is substantially at the fly height and velocity relative to the disk 250. The heater 216 may be driven in a sinusoidal or cosinusoidal wave form at the frequency. The frequency is less than the heater response frequency, sufficient to generate velocities of the deformation 219 that can be measured using the Doppler shift, and sufficiently different from the frequency of other known components to displacement of the slider. Thus the response of the system 200 to the heater 216 may be determined. Driving the heater heats the head, which may cause a portion of the ABS to deform. FIG. 7 depicts the system 200 when step 154 results in a particular protrusion 219 of the ABS 218'. As the heater is driven in an AC manner, the size and shape of the protrusion 219 changes over time. For comparison, the undeformed ABS is shown by dotted lines.

Doppler measurements are performed across the ABS 218' using the laser Doppler vibrometer 220, via step 156. Step 156 is performed while steps 152 and 154 are also performed. Thus, Doppler measurements are taken while the heater is being driven and while the slider is subjected to the desired operating conditions with respect to the disk. To perform the measurements in step 156, the laser Doppler vibrometer 220 provides laser light 222 through the disk 250 in a direction substantially perpendicular to the surface of the disk 250. The disk 250 is thus transparent to the light used by the laser Doppler vibrometer 220. In some embodiments, the disk 250 is a glass disk. However, in other embodiments, the disk 250 may have another composition that is transparent to the light 222. After traversing the disk 250, the light 222 is reflected by the ABS 218' and returns to the laser Doppler vibrometer 220. Based upon a difference in frequency between the light reflected from the ABS 218' and the light from the laser that has not undergone such a reflection, the velocity of the ABS 218' in a direction perpendicular to the surface of the disk 250 may be determined. The laser Doppler vibrometer 250 may output velocities for various locations on the ABS 218' to the velocity displacement decoder 220. Although depicted as measuring the protrusion 219 of the ABS 218', Doppler measurements may be taken at other locations across the ABS. For example, measurements may be taken at the leading edge of the ABS 218'. Further, as the heater 216 is driven at a frequency, the heat provided and thus protrusion 219 changes. Consequently, in addition to taking data at various locations across the ABS 218', multiple Doppler measurements are also made at these locations over time. In the embodiment shown, the output of the laser Doppler vibrometer 220 is a velocity.

The velocities for each location measured are translated to displacements, via step 158. Step 158 may be performed by the velocity displacement decoder 230. This may be accomplished by integrating the velocity of each location over time. For example, assume that the voltage applied to the heater is given by: $V(t)=V_0 \sin(\omega_h t)$. The power generated by the heater is then given by $P(t)=(V_0^2/(2R))*(1-\cos(2*\omega_h t))$, where R is the resistance of the heater element. The thermal protrusion is generally proportional to the power and given by $A(t)=(kV_0^2/2R)*(1-\cos(2*\omega_h*t))$, where k is a constant of proportionality and an intrinsic measure of the actuation efficiency of the heater system. Thus, the protrusion has a constant component of $kV_0^2$ and an AC component $(kV_0^2/2R)*(\cos(2*\omega_h*t))$. The range of A(t) is from zero through $kV_0^2/2R$. The velocity is then given by $y(t)=-(kV_0^2/2R)(\cos(2*\omega_h*t))$. Thus, based on the velocity determined by the laser Doppler vibrometer 220, a change in displacement can be calculated. The calculation may be carried out for various locations across the ABS 218'. Thus, the change in displacement of the ABS 218', including the region of the protrusion 219, may be determined.

Post processing of the measured displacement may also be performed because the Doppler shift used by the laser Doppler vibrometer 220 measures velocity and changes in displacement, rather than displacement itself. The measurement may thus be insensitive to components of the velocity such as pole tip recession and dynamic pitch attitude of the flying head. Consequently, additional processing is performed. The data may optionally be smoothed or otherwise processed, via step 160. In some embodiments, the change in displacement calculated in step 158 is smoothed in step 160. However, in other embodiments, raw data, velocity data from the laser Doppler vibrometer 220, or analogous data may be smoothed or otherwise processed in step 160. Step 160 may also be performed by the velocity displacement decoder 230. The pitch, $\alpha_1$ of the slider 210 may also be accounted for, via step 162. Step 162 may be performed based on the known pitch of the slider 210 prior to heating. For example, the locations of portions of the ABS 218 are known and may be combined with the changes in displacement determined in step 158.

The initial shape of the ABS is also accounted for, via step 164. As with step 162, step 164 may be performed arithmetically. The known profile of the ABS 218 prior to the heater 216 being driven may also be combined with the displacement determined in step 158.

Finally, rigid body motion, Ah, of the slider 210 may also be accounted for, via step 166. Rigid body motion may change the orientation of the slider 210 because as the portion 219 of the ABS protrudes toward the disk 250, the remainder of the slider 210 is pushed further from the disk 250. Stated differently, regions 219 for which the thermal deformation exceeds the pushback of the air-bearing formed between the slider 210 and the disk 250 move in phase with the excitation power of the heater. Thus, such regions move closer to the disk 250 with increasing heater power. There is, however, pushback from the air bearing. Consequently, other portions of the slider move only due to pushback/rigid body motion. These portions of the slider 210 move away from the disk 250 with increasing heater power. The angle $\alpha_2$ made by the slider may thus change. By making Doppler measurements in step 156 at locations distal from the protrusion 219, such as the left side of the slider 210 as shown in FIG. 7, the rigid body motion may also be determined. The rigid body motion may also be subtracted from the displacement determined in step 158. By accounting for rigid body motion, pitch, and the initial shape of the slider 210, the actual shape of the ABS 218' may be determined.

Using the method 150, the shape of the ABS may be determined with applied heating while at normal/desired operating conditions. The shape of the ABS directly measured using the method may be closer to what would be encountered in an operating disk drive. As a result, a more accurate profile of the ABS under normal operating conditions may be obtained. This profile may be used, for example in optimizing the desired fly height and other characteristics of the disk drive. Thus, design and manufacturing of disk drives employing the slider 210 and a disk analogous to the disk 250 may be improved. Further, in accounting for the rigid body motion of the slider 210, the pushback by the air bearing may be quantified. Finally, the heater 216 may be resistive or may generate heat in another manner. For example, the heater 216 might be an internal laser in an energy-assisted magnetic recording (EAMR) head. The resultant deformation of the ABS 218' including such a component in the slider 210 may thus be measured. Finally, the method 150 might be used to calibrate other, indirect, methods of determining the thermal protrusion of the ABS 218'.

We claim:

1. A method for determining a shape of a portion of an air-bearing surface (ABS) of a head residing on a slider, the ABS configured to fly at a fly height from and with a velocity with respect to a disk during normal operating conditions, the method comprising:
    driving at least one heater residing in the head while the slider is substantially at the normal operating conditions with respect to the disk and the fly height, the shape of the portion of the ABS changing in response to the at least one heater being driven;
    performing a plurality of Doppler measurements on at least the portion of the slider while the heater is driven, the plurality of Doppler measurements measuring at least one velocity of at least one change in the shape of the portion of the ABS; and
    determining the shape based on the plurality of Doppler measurements.

2. The method of claim 1, wherein the step of performing the plurality of Doppler measurements further includes:
    utilizing a laser Doppler vibrometer to provide laser light to the at least the portion of the ABS and receive reflected laser light from the at least the portion of the ABS.

3. The method of claim 2, wherein the step of utilizing the laser Doppler vibrometer further includes:
    providing the laser light from the laser Doppler vibrometer to the head through the disk and receiving reflected laser light from the head through the disk, the disk being transparent to the laser light and the reflected laser light.

4. The method of claim 2, wherein a direction of travel of the laser light is substantially perpendicular to a surface of the disk.

5. The method of claim 1 wherein the step of determining the shape of the portion of the ABS further includes:
    converting the velocity to a displacement; and
    determining the shape based on the displacement.

6. The method of claim 1, wherein the step of determining the shape further includes:
    accounting for an initial shape of the portion of the ABS.

7. The method of claim 1, wherein only a portion of the plurality of Doppler measurements are performed on the portion of the ABS.

8. The method of claim 7, wherein the step of determining the shape further includes:
    accounting for rigid body motion of the slider.

9. The method of claim 1, wherein the step of driving the heater further includes:
    driving the at least one heater at least one frequency.

10. A method for determining a shape of a portion of an air-bearing surface (ABS) of a head residing on a slider, the ABS configured to fly at a fly height from and with a slider velocity with respect to a disk during normal operating conditions, the method comprising:
    driving at least one heater residing in the head while the slider is substantially at the normal operating conditions with respect to the disk and the fly height, the shape of the portion of the ABS changing in response to the at least one heater being driven, wherein the portion of the ABS deforms in response to a change in heat provided by the at least one heater;
    performing a plurality of Doppler measurements on at least the portion of the slider while the heater is driven, the step of performing the plurality of Doppler measurements further including
        utilizing a laser Doppler vibrometer to provide laser light to the at least the portion of the ABS and receive reflected laser light from the at least the portion of the ABS; and
        measuring a velocity of a deformation of the portion of the ABS using each of the plurality of Doppler measurements; and
    determining the shape based on the plurality of Doppler measurements.

11. The method of claim 10, wherein the step of determining the shape further includes:
    accounting for a pitch of the head with respect to the surface of the disk.

12. A method for determining a shape of a portion of an air-bearing surface (ABS) of a head residing on a slider, the ABS configured fly at a fly height from and with a velocity with respect to a disk during normal operating conditions, the method comprising:
    driving at least one heater at a frequency while the slider substantially at the normal operating conditions respect to the disk and the fly height, the at least one heater residing in the head, the shape of the portion of the ABS changing in response to the at least one heater being driven;
    performing a plurality of Doppler measurements using a laser Doppler vibrometer on the slider while the heater is driven, the laser Doppler vibrometer providing laser light through the disk to the at least the portion of the ABS, the disk being transparent to the laser light, a direction of travel of the light being substantially perpendicular to a surface of the disk, a portion of the plurality of Doppler measurements being performed on the portion of the ABS, each of the plurality of Doppler measurements measuring a velocity of a deformation of the portion of the ABS; and
    determining the shape from the velocity of each of the plurality of Doppler measurements, the step of determining the shape further including accounting for a pitch of the head with respect to the surface of the disk, an initial shape of the portion of the ABS, and rigid body motion of the slider.

13. A system for determining a shape of a portion of an air-bearing surface (ABS) of a head residing on a slider, the ABS configured to fly at a fly height from and with a velocity with respect to a disk during normal operating conditions, the head also including at least one heater, the system comprising:
    a disk having a surface, the system being configured such that the ABS is substantially at the normal operating conditions respect to the surface of the disk and the fly height while the at least one heater is driven;
    a Doppler vibrometer configured to perform a plurality of Doppler measurements on at least the portion of the ABS while the heater is driven, the Doppler vibrometer providing laser light to the head, receiving reflected laser light from the head, and outputting a Doppler signal indicating a velocity of the portion of the head, the velocity corresponding to a change in a shape of the portion of the ABS while the at least one heater is driven; and
    a velocity displacement decoder coupled with the laser Doppler vibrometer for converting the velocity to a displacement, the displacement indicating the change in shape of the portion of the ABS.

14. The system of claim 13, wherein the laser Doppler vibrometer further provides laser light substantially perpendicular to the surface of the disk.

15. The system of claim 13, wherein the disk is transparent to the laser light and wherein the laser Doppler vibrometer further provides the laser light to the head through the disk.

16. The system of claim 15, wherein a direction of travel of the light is substantially perpendicular to a surface of the disk.

17. The system of claim 13, wherein the system further includes means for accounting for a pitch of the head with respect to the surface of the disk.

18. The system of claim 13, wherein the system further includes means for accounting for an initial shape of the portion of the ABS.

19. The system of claim 13, wherein only a portion of the plurality of Doppler measurements are performed on the portion of the ABS.

20. The system of claim 13, wherein the system further includes means for accounting for rigid body motion of the slider.

* * * * *